Patented Sept. 11, 1951

2,567,842

UNITED STATES PATENT OFFICE 2,567,842

METHOD OF PREPARING GLYCIDYL ESTER

John G. Erickson, Greenwich, Conn., assignor to American Cyanamid Company, New York, N. Y., a corporation of Maine No Drawing. Application June 19, 1948, Serial No. 34,141

15 Claims. (Cl. 260—348.6)

This invention relates to a new and improved method of preparing glycidyl esters. More particularly it relates to a method of preparing a glycidyl ester which comprises effecting dehydrohalogenation of (1) a compound represented by the general formula I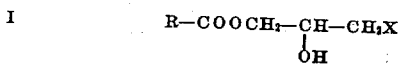
$$R-COOCH_2-CH-CH_2X$$
$$\ \ \ \ \ \ \ \ \ \ \ \ \ \ \ \ \ \ |$$
$$\ \ \ \ \ \ \ \ \ \ \ \ \ \ \ \ \ \ OH$$

where R represents a monovalent hydrocarbon radical and X represents a halogen selected from the class consisting of chlorine and bromine, the hydrohalide which is split off being represented by HX, where X is a halogen corresponding to that which is present in the compound of (1). The dehydrohalogenation of the compound of (1) is effected by contacting it, that is, by bringing it into reactive relationship, with (2) a base selected from the class consisting of alkali-metal alkoxides (e. g., sodium and potassium ethoxides, sodium and potassium tert.-butoxides, etc.) and hydroxides of the alkali metals (sodium, potassium, lithium, caesium and rubidium) and of the alkaline-earth metals (calcium, strontium and barium). Thereafter the glycidyl ester that is formed is isolated, e. g., by distillation, from the resulting reaction mass.

Illustrative examples of monovalent hydrocarbon radicals which R in the above formula may represent are: aliphatic (e. g., methyl, ethyl, propyl, isopropyl, n-butyl, sec.-butyl, amyl, isomyl, hexyl, octyl, decyl, dodecyl to octadecyl, inclusive, allyl, 1-butenyl, 2-butneyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 1,3-pentadienyl, 2,4-hexadienyl, 2-octenyl, 3-nonenyl, 2-decenyl, methallyl, ethallyl, propallyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenyl or xenyl, naphthyl, etc.); aliphatic-substituted aryl (e. g., tolyl, xlyl, ethylphenyl, vinylphenyl, isopropenylphenyl, allylphenyl, 2-butenylphenyl, tert.-butylphenyl, etc.) and aryl-substituted aliphatic (e. g., benzyl, cinnamyl, phenylethyl, phenylpropyl, etc.).

It was suggested prior to my invention that glycidol be prepared by removing HCl from glycerol α-monochlorohydrin by reacting the latter with a basic or basic-acting compound under conditions tending to favor the formation of the corresponding desired glycidol (see U. S. Patent No. 2,248,635). Suitable basic compounds for this purpose were said to be the metal oxides, the metal hydroxides (including the alkali-metal hydroxides such as sodium and potassium hydroxides), the metal carbonates, the metal bicarbonates, the metal borates, ammonia, basic ammonium compounds such as the amines, hydroxyl amine, etc.

Numerous methods of making various glycidyl esters also were known or suggested prior to my invention (see, for example, U. S. Patent No. 2,252,030 which discloses various methods of preparing a particular class of glycidyl esters). Because of the reactive epoxy grouping which such esters contain, it is considerably more difficult to prepare and isolate them in good yields than is encountered in the production of the simple, inert or relatively inactive esters. I have found that the preparation of glycidyl esters, specifically glycidyl acrylate and methacrylate, by effecting reaction between (1) an alkali-metal salt, more particularly the potassium salt, of a monocarboxylic acid (e. g., acrylic acid, methacrylic acid, etc.) and (2) epichlorohydrin has some advantages, as for instance from a yield standpoint, over other methods. This method is described more fully in my copending application Serial No. 34,142, filed concurrently herewith, now Patent No. 2,556,075, dated June 5, 1951, with particular reference to the preparation of glycidyl acrylate, glycidyl methacrylate and glycidyl crotonate. In this method an excess of epichlorohydrin over stoichiometrical proportions usually is employed, the excess epichlorohydrin functioning as a solvent medium in which the reaction is effected. This excess solvent is unobjectionable when the glycidyl esters are prepared on a laboratory scale, but the relatively large amount of epichlorohydrin employed presents explosive hazards when the process is carried out on a larger scale.

It is a primary object of the present invention to provide an economical method of preparing glycidyl esters, specifically glycidyl acrylate and glycidyl methacrylate, which method is free from explosive hazards, and whereby satisfactory yields of such esters are obtained.

These and other objects are attained by practicing the method hereinafter more fully described.

In practicing my invention a compound of the kind embraced by Formula I is dehydrohalogenated by effecting intimate contact (more particularly by stirring or otherwise mixing or agitating) between the said compound and an alkali-metal alkoxide (the preferred base) or with a hydroxide of an alkali metal or of an alkaline-earth metal, or with a mixture thereof. The starting 2-hydroxy-3-halogenopropyl ester is dehydrohalogenated, yielding a glycidyl ester which may be represented by the general formula II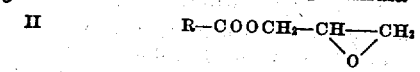
$$R-COOCH_2-CH\!-\!\!-\!CH_2$$
$$\ \ \ \ \ \ \ \ \ \ \ \ \ \ \ \ \ \ \ \ \ \ \ \ \ \ \ \ \backslash\ /$$
$$\ \ \ \ \ \ \ \ \ \ \ \ \ \ \ \ \ \ \ \ \ \ \ \ \ \ \ \ \ O$$

where R has the same meaning as given above with reference to Formula I.

I have found that only certain classes of bases are operative in the dehydrohalogenation of the 2-hydroxy-3-halogenopropyl esters used in practicing my invention, which is in marked contrast with the teachings of the prior art (see U. S. Patent No. 2,248,635, supra) with respect to the dehydrochlorination of glycerol α-monochlorohydrin. Hence it will be seen that the dehydrohalogenation of a 2-hydroxy-3-halogenopropyl compound by reaction with a base broadly is not a general reaction, since not all bases or basic-acting substances are reactive with all such compounds. It was, therefore, quite surprising and unexpected and in no way could have been predicted that certain 2-hydroxy-3-chloropropyl and -3-bromopropyl compounds, specifically the esters, could be effectively dehydrohalogenated by intimately commingling or otherwise causing an intimate contact or association of such esters with certain particular bases. It was also unobvious and unpredictable that the alkali-metal alkoxides (e. g., sodium and potassium tert.-butoxides) could be used effectively as a reactant with the aforementioned hydroxy halogenopropyl esters thereby to cause dehydrohalogenation of the latter and the formation of the corresponding glycidyl ester. Furthermore, it might be expected that cleavage of the hydroxy halogenopropyl esters by either (a) ester interchange (when alkali-metal alkoxides are used as bases for the dehydrohalogenation) or (b) hydrolysis (when aqueous bases are used) would take place to such an extent that none of the desired dehydrohalogenation product, i. e., the glycidyl ester, would be obtained. This has been found not to be the case; in other words, reactions of the types described under (a) and (b) do not occur to such an extent (if at all) as to preclude the formation of the desired glycidyl ester.

Illustrative examples of 2-hydroxy-3-chloropropyl esters and of 2-hydroxy-3-bromopropyl esters which may be used in carrying my invention into effect are the following:

2-hydroxy-3-chloropropyl acetate
2-hydroxy-3-bromopropyl acetate
2-hydroxy-3-chloropropyl propionate
2-hydroxy-3-bromopropyl n-butyrate
2-hydroxy-3-chloropropyl isobutyrate
2-hydroxy-3-bromopropyl valerate
2-hydroxy-3-chloropropyl caproate
2-hydroxy-3-bromopropyl heptylate
2-hydroxy-3-chloropropyl caprylate
2-hydroxy-3-bromopropyl nonylate
2-hydroxy-3-chloropropyl caprate
2-hydroxy-3-bromopropyl palmitate
2-hydroxy-3-chloropropyl margarate
2-hydroxy-3-chloropropyl stearate
2-hydroxy-3-chloropropyl oleate
2-hydroxy-3-bromopropyl acrylate
2-hydroxy-3-bromopropyl methacrylate
2-hydroxy-3-chloropropyl ethacrylate
2-hydroxy-3-chloropropyl crotonate
2-hydroxy-3-chloropropyl sorbate
2-hydroxy-3-bromopropyl linoleate
2-hydroxy-3-chloropropyl cinnamate
2-hydroxy-3-bromopropyl benzoate
2-hydroxy-3-chloropropyl phenylacetate
2-hydroxy-3-chloropropyl tolylacetate
2-hydroxy-3-chloropropyl methylbenzoate
2-hydroxy-3-bromopropyl 1-naphthoate
2-hydroxy-3-chloropropyl 2-naphthoate Other examples will be apparent to those skilled in the art from Formula II and from the illustrative examples of monovalent hydrocarbon radicals that R in the said formula may represent, which examples were given hereinbefore with particular reference to Formula I.

Various methods of preparing the 2-hydroxy-3-halogenopropyl esters, which are used in practicing my invention, may be employed. For instance, they may be prepared by effecting reaction between glycerol α-monochlorohydrin or glycerol α-monobromohydrin and an acid chloride or anhydride.

Alkali-metal hydroxides (or mixtures thereof), hydroxides of the alkaline-earth metals (or mixtures of such hydroxides) or alkali-metal alkoxides (or mixtures thereof), or mixtures of any of these general classes of bases, may constitute the basic substance which is employed in practicing my invention. Illustrative examples of alkali-metal alkoxides that may be used are the alkali-metal (sodium, potassium, lithium, caesium or rubidium) methoxide, ethoxides, propoxides, n-butoxides, sec.-butoxides, tert.-butoxides, amoxides, hexoxides, heptoxides, octoxides, monoxides, decoxides, etc. The sodium or potassium alkoxides are preferred over alkoxides of other alkali metals for economical reasons. I prefer to use a tert.-alkoxide, for instance an alkali-metal tert.-butoxide or tert.-amoxide, and more particularly sodium or potassium tert.-butoxide or sodium or potassium tert.-amoxide, since optimum results have been obtained by the use of such bases. Surprisingly, the alkali-metal carbonates are ineffective for dehydrohalogenating a 2-hydroxy-3-chloro (or 3-bromo)-propyl ester, as also are tertiary amines and numerous other bases outside the three general classes above mentioned and which might be expected to be operative in a dehydrohalogenation reaction.

The reaction between the 2-hydroxy-3-halogenopropyl ester and the base may be carried out in any suitable manner, but preferably it is effected in the presence of a suitable liquid diluent or solvent. Illustrative examples of liquid media in which the reaction may be effected are liquid hydrocarbons (e. g., benzene, toluene, xylene, hexane, heptane, octane, nonane, etc.), dioxane, ethers (e. g., diethyl ether, dipropyl ether, dibutyl ether, anisole, phenetole, etc.), ketones (e. g., acetone, diethyl ketone, dipropyl ketone, dibutyl ketone, methyl ethyl ketone, methyl propyl ketone, ethyl butyl ketone, acetophenone, etc.), alcohols, more particularly monohydric alcohols, e. g., n-propyl alcohol, isopropyl alcohol, n-butyl alcohol, isobutyl alcohol, sec.-butyl alcohol, amyl alcohol, etc., preferably tertiary monohydric alcohols (e. g., tert.-butyl alcohol, tert.-amyl alcohol, etc.), and the like. The liquid diluent or solvent is preferably one in which the glycidyl ester is inert or relatively inert, so that optimum yield of the product may be obtained; and preferably, also, is a volatile one which has a boiling point or range which is different (i. e., either higher or lower) than the glycidyl ester resulting from the reaction in order that the latter more readily may be isolated, as by distillation, from the reaction mass.

If the reaction be effected in the presence of a liquid medium, the amount of the latter may be varied as desired or as conditions may require. For instance, the amount of base plus 2-hydroxy-3-halogenopropyl ester may be from about 5% to about 95% by weight of the reaction mass, the liquid diluent or solvent constituting the remainder. If a liquid medium be used, it is generally employed in an amount corresponding to from about 0.1 to about 20 times (e. g., from 1 to 5 or 6 times) the volume of the base plus 2-hydroxy-3-halogenopropyl ester used, depending, for instance, upon the particular ester which is being dehydrohalogenated and the particular liquid medium employed. In some cases it may be desirable to effect the reaction in the absence of a liquid diluent or solvent. Ordinarily, however, the dehydrohalogenation is effected in a liquid medium since thereby a more intimate contact between the base and the ester can be effected, and the glycidyl ester which is formed can be isolated from the reaction mass more easily and in a higher yield.

The dehydrohalogenation reaction may be carried out under a variety of temperature and pressure conditions, for instance at normal (or slightly below normal) temperatures or at elevated temperatures, and under atmospheric, sub-atmospheric or super-atmospheric pressures. For instance, the dehydrohalogenation may be effected at temperatures ranging between 15° C. (about 15° C.) and the boiling temperature of the reaction mass, it being understood, of course, that the temperature employed is in all cases below that at which thermal decomposition of the 2-hydroxy-3-halogenopropyl ester or of the glycidyl ester occurs. Thus, the dehydrohalogenation may be effected at a temperature ranging between about 15° C. and about 100° or 150° C., depending upon the particular starting ester employed and the other reaction conditions. Preferably the reaction is effected at a temperature ranging between 15° C. (about 15° C.) and 40° C. (about 40° C.), e. g., at 20° C. to 30° C. (normal room temperature), since thereby the formation of undesired by-products is minimized or obviated. When such relatively low temperatures are used, the reaction generally is effected in the presence of a liquid solvent or diluent. In some cases temperatures below 15° C., e. g., 0° C. or 5° C. or 10° C., may be used, but no particular advantages ordinarily accrue therefrom.

The base and 2-hydroxy-3-halogenopropyl ester may be employed in various ratios, for instance in stoichiometrical proportions or with either in excess over stoichiometrical proportions, e. g., from 5 to 40 mole per cent in excess over stoichiometrical proportions. I prefer to use the base and the 2-hydroxy-3-halogenopropyl ester either in stoichiometrical amounts or with the base in excess of stoichiometrical proportions. For example, when using a monobasic compound such as an alkali-metal alkoxide or an alkali-metal hydroxide, I prefer to use the 2-hydroxy-3-halogenopropyl ester and the base in a ratio corresponding to at least 1 mole (e. g., 1 or 1.05 to 1.4 moles) of the latter for each mole of the former. If desired, higher proportions of base to 2-hydroxy-3-halogenopropyl ester may be employed, e. g., from 50 mole per cent to 500 or 600 mole per cent (or more) in excess over stoichiometrical proportions, but no particular advantages appear to accrue therefrom. From this it will be seen that, if desired, a 2-hydroxy-3-halogenopropyl ester of the kind embraced by Formula I and an alkali-metal hydroxide or alkoxide may be used in a ratio corresponding to from 1 to 5 or 6 moles or more of the latter for each mole of the former. If an excess of base be used or if all of the base has not reacted, it is often desirable to neutralize the free base remaining in the reaction mass prior to distillation of the mass to isolate the glycidyl ester. The use of any large excess of 2-hydroxy-3-halogenopropyl ester over the stoichiometrical equivalent amount of base merely causes a larger amount of starting halogenopropyl ester to remain in the reaction mass.

The glycidyl ester resulting from the dehydrohalogenation reaction may be isolated from the reaction mass in any suitable manner, e. g., by extraction with a suitable solvent or by distillation. Usually the reaction mass is filtered to separate the salts formed by the evolved hydrohalide and any other undesired solids that may be present. If the reaction was not effected in a liquid medium, a suitable liquid diluent or solvent may be added to the reaction mass to facilitate filtration; or, if the amount of liquid diluent or solvent present in the reaction mass is insufficient for ease of filtration of the mass, an additional amount of liquid diluent or solvent may be added to facilitate filtration. The glycidyl ester then may be separated from the filtrate by distillation (under reduced pressure if necessary or advisable), if it has a lower boiling point than the liquid diluent or solvent which is present in the filtrate; or by distilling off the latter if its boiling point is lower than that of the glycidyl ester.

In preparing unsaturated glycidyl esters it is often desirable, in order to obtain an optimum yield of the ester, to effect the dehydrohalogenation reaction in the presence of a material which is adapted to inhibit polymerization through the ethylenically unsaturated grouping, more particularly a vinyl-type polymerization inhibitor. In this way the formation of polymeric material during the reaction period is obviated or minimized. Any suitable polymerization inhibitor of the aforementioned type or kind may be employed, e. g., phenyl-α-naphthylamine, N,N'-di-2-naphthyl-p-phenylenediamine, finely divided copper, certain cupric salts, e. g., cupric acetate, etc. The amount of the polymerization inhibitor may be considerably varied, but ordinarily it is employed in an amount not exceeding 3%, generally less than 1%, by weight of the 2-hydroxy-3-halogenopropyl ester, e. g., from 0.01% to 0.5 or 0.6% by weight of the said ester.

In order that those skilled in the art better may understand how the present invention may be carried into effect, the following examples are given by way of illustration and not by way of limitation. All parts are by weight.

*Example 1*

| | Parts |
|---|---|
| Glycerol α-monochlorohydrin | 110.5 |
| Acrylyl chloride | 92.0 |
| Acetonitrile (dry) | 313.0 |
| Triethylamine (dry) | 103.0 |
| Polymerization inhibitor, specifically hydroquinone | 0.5 |

All of the above ingredients with the exception of the acrylyl chloride were mixed together. The mixture was stirred and held at 10°–15° C. by an ice bath while the acrylyl chloride was added over a period of 1½ hours. The mixture was stirred for ½ hour longer in the ice bath, after which it was filtered and the filter cake was washed with cold acetonitrile. The solvent was removed from the combined filtrate and washings by distillation under 15 mm. pressure. The reaction product (residue) was then distilled under 4 mm. pressure. Fractionation of the distillate by redistillation under reduced pressure yielded 76.6 parts of 2-hydroxy-3-chloropropyl acrylate, B. P. 89°–91° C. at 4 mm. pressure; $n_D^{25.5}$, 1.4733; $d_4^{25.5}$, 1.226.

Instead of glycerol α-monochlorohydrin, an equivalent amount of glycerol α-monobromohydrin may be employed thereby to obtain 2-hydroxy-3-bromopropyl acrylate.

Example 2

|  | Parts |
|---|---|
| Glycerol α-monochlorohydrin | 110.5 |
| Methacrylyl chloride | 110.0 |
| Acetonitrile (dry) | 313.0 |
| Triethylamine (dry) | 106.0 |
| Polymerization inhibitor, specifically hydroquinone | 0.5 |

The methacrylyl chloride was added over a period of 30 minutes to a well-stirred mixture of the other ingredients. The mixture was kept from getting warmer than 60° C. by external cooling of the reaction vessel. After standing for about 16 hours at room temperature, the reaction mass was filtered. Fractional distillation of the filtrate under reduced pressure yielded 33.7 parts of 2-hydroxy-3-chloropropyl methacrylate, B. P. 104°–108° C. at 5 mm. pressure; $n_D^{24.6}$, 1.4738.

Instead of glycerol α-monochlorohydrin, an equivalent amount of glycerol α-monobromohydrin may be used thereby to obtain 2-hydroxy-3-bromopropyl methacrylate.

In a manner similar to that above described with particular reference to the preparation of 2-hydroxy-3-chloropropyl acrylate and methacrylate, other 2-hydroxy-3-chloropropyl esters and 2-hydroxy-3-bromopropyl esters may be prepared, e. g., 2-hydroxy-3-chloropropyl crotonate, 2-hydroxy-3-bromopropyl crotonate, etc.

Example 3

A solution of 32.9 parts of 2-hydroxy-3-chloropropyl acrylate in about 53.5 parts of absolute ethyl ether was added to a suspension of 22.9 parts of sodium tert.-butoxide in about 214 parts of absolute ethyl ether. The mixture was stirred at room temperature (20°–30° C.) for 3 hours, filtered and distilled under a pressure of 65–70 mm. Redistillation of the distillate under reduced pressure yielded 8.3 parts of glycidyl acrylate, B. P. 98°–100° C. at 65 mm. pressure, $n_D^{20}=1.4472$, $d_4^{20}=1.0993$.

Example 4

A solution of 25 parts of 2-hydroxy-3-chloropropyl methacrylate in about 107 parts of absolute ethyl ether was added to a suspension of 13.7 parts of sodium tert.-butoxide in about 158 parts of tert.-butyl alcohol. The mixture was stirred for 1 hour at room temperature and filtered. Distillation of the filtrate under reduced pressure gave 10.5 parts of glycidyl methacrylate, B. P. 65° C. at 5 mm. pressure, $n_D^{20}=1.4506$, $d_4^{20}=1.0760$.

Example 5

2-hydroxy-3-chloropropyl benzoate (58.2 parts) was added to a suspension of 19.6 parts of sodium tert.-butoxide in about 221 parts of tert.-butyl alcohol. The mixture was stirred for a few minutes at room temperature, neutralized with hydrochloric acid and filtered. Distillation of the filtrate under reduced pressure yielded glycidyl benzoate, B. P. 95°–100° C. at 6 mm. pressure.

Example 6

2-hydroxy-3-chloropropyl acetate (47.0 parts) was added to a solution of sodium ethoxide formed by dissolving 6.9 parts of sodium in about 118 parts of absolute ethyl alcohol. The mixture was stirred for a few minutes at room temperature and filtered. Distillation of the filtrate under reduced pressure gave 13.2 parts of glycidyl acetate, B. P. 62° C. at 14 mm. pressure.

Example 7

2-hydroxy-3-chloropropyl acetate (45.7 parts) was added to a solution of 12 parts of sodium hydroxide in 100 parts of water. The mixture was shaken at room temperature for 10 minutes, then extracted with two portions of 100 parts each of ethyl ether. Distillation of the ether extract, followed by redistillation of the ether-free fraction yielded glycidyl acetate, B. P. 118° C. at 115 mm. pressure.

Example 8

Sixty-one (61) parts of 2-hydroxy-3-chloropropyl acetate was added to a suspension of 29.6 parts of calcium hydroxide in 200 parts of water. The mixture was shaken for 45 minutes at room temperature, then extracted with four portions of 100 parts each of ethyl ether. Glycidyl acetate was isolated by distillation of ether extract under reduced pressure.

It will be understood, of course, by those skilled in the art that my invention is not limited to the particular 2-hydroxy-3-halogenopropyl esters, to the particular bases or to the particular liquid media, reaction temperatures or other conditions employed in the above illustrative examples. Thus, instead of the 2-hydroxy-3-chloropropyl esters used in Examples 3 to 8, inclusive, equivalent amounts of the corresponding 2-hydroxy-3-bromopropyl esters may be used to obtain the corresponding glycidyl esters. Also, instead of the particular bases employed in these examples, any of the other alkali-metal alkoxides or hydroxides or of the other hydroxides of the alkaline-earth metals may be employed. Other liquid dispersion or solvent media, numerous examples of which have been given hereinbefore, may be used instead of the particular media used in these examples; or, as previously has been stated, the dehydrohalogenation reaction may be effected in the absence of a liquid solvent or diluent or dispersion medium.

Other glycidyl esters may be prepared in a manner similar to that described under Examples 3 to 8, inclusive, by substituting an equivalent amount of other 2-hydroxy-3-chloropropyl esters or 2-hydroxy-3-bromopropyl esters, numerous examples of which have been given hereinbefore, for the particular hydroxy halogenopropyl esters employed in these illustrative examples.

Specific examples of products of the method of this invention are glycidyl esters corresponding to the 2-hydroxy-3-halogenopropyl esters mentioned hereinbefore by way of illustration. Other examples will be apparent to those skilled in the art from Formula II and from the examples of monovalent hydrocarbon radicals which R in this formula may represent.

I claim:

1. The method of preparing a glycidyl ester which comprises effecting dehydrohalogenation of (1) a compound represented by the general formula

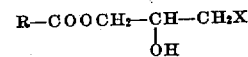

where R represents a monovalent hydrocarbon radical and X represents a halogen selected from the class consisting of chlorine and bromine, the hydrohalide which is split off being represented by HX, where X is a halogen corresponding to that which is present in the compound of (1), said dehydrohalogenation being effected by agitating a mixture containing the said compound of (1), (2) a base selected from the class consisting of alkali-metal alkoxides, and hydroxides of the alkali metals and of the alkaline-earth metals, and (3) a volatile liquid which is inert during the dehydrohalogenation, said mixture being at a temperature ranging between 15° C. and its boiling temperature, and isolating the glycidyl ester that is formed from the resulting reaction mass.

2. A method as in claim 1 wherein X represents chlorine.

3. A method as in claim 1 wherein the base of (2) is an alkali-metal alkoxide.

4. A method as in claim 1 wherein the base of (2) is an alkali-metal hydroxide.

5. A method as in claim 1 wherein the dehydrohalogenation reaction is effected at a temperature ranging between 15° C. and 40° C.

6. The method of preparing a glycidyl ester which comprises effecting dehydrochlorination of (1) a compound represented by the general formula

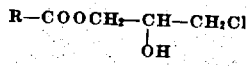

where R represents a monovalent hydrocarbon radical, by agitating a mixture containing the said compound of (1) and, also, (2) an alkali-metal alkoxide in a ratio corresponding to at least 1 mole of the latter for each mole of the former, together with (3) a volatile liquid which is inert during the dehydrochlorination, said mixture being at a temperature ranging between 15° C. and its boiling temperature, and isolating the glycidyl ester that is formed from the resulting reaction mass.

7. A method as in claim 6 wherein R represents an aliphatic hydrocarbon radical.

8. A method as in claim 7 wherein the aliphatic hydrocarbon radical is a vinyl radical.

9. A method as in claim 7 wherein the aliphatic hydrocarbon radical is an isopropenyl radical.

10. The method as in claim 6 wherein the dehydrochlorination reaction is effected at a temperature ranging between 15° C. and 40° C.

11. A method as in claim 6 wherein the alkali-metal alkoxide is sodium tert.-butoxide.

12. A method of preparing glycidyl acrylate which comprises dehydrochlorinating 2-hydroxy-3-chloropropyl acrylate by agitating a mixture containing the said chloropropyl acrylate and sodium tert.-butoxide and, also, a volatile liquid which is inert during the dehydrochlorination, said mixture being at a temperature ranging between 15° C. and 40° C., and isolating glycidyl acrylate from the resulting reaction mass.

13. A method of preparing glycidyl methacrylate which comprises dehydrochlorinating 2-hydroxy-3-chloropropyl methacrylate by agitating a mixture containing the said chloropropyl methacrylate and sodium tert.-butoxide and, also, a volatile liquid which is inert during the dehydrochlorination, said mixture being at a temperature ranging between 15° C. and 40° C., and isolating glycidyl methacrylate from the resulting reaction mass.

14. A method of preparing an ethylenically-unsaturated aliphatic glycidyl ester which comprises dehydrochlorinating a compound represented by the general formula

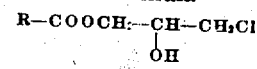

where R represents a monovalent, ethylenically-unsaturated aliphatic hydrocarbon radical, by agitating a mixture containing the said compound and sodium tert.-butoxide and, also, a volatile liquid which is inert during the dehydrochlorination, said mixture being at a temperature ranging between 15° C. and 40° C., and isolating the ethylenically-unsaturated aliphatic glycidyl ester thereby produced from the resulting reaction mass.

15. A method as in claim 14 wherein R in the general formula of the compound which is dehydrochlorinated represents a monovalent, ethylenically-unsaturated aliphatic hydrocarbon radical containing not less than two and not more than three carbon atoms.

JOHN G. ERICKSON.

REFERENCES CITED

The following references are of record in the file of this patent:

UNITED STATES PATENTS

| Number | Name | Date |
|---|---|---|
| 2,198,367 | Jacobi | Apr. 23, 1940 |
| 2,252,039 | Schirm | Aug. 12, 1941 |
| 2,470,324 | Staudinger | May 17, 1949 |

OTHER REFERENCES

Comptes Rendus, vol. 151, pp. 883–884 (C. ___, vol. 5, p. 1590).

Comptes Rendus, vol. 204, pp. 272–274 (C. A., vol. 32, p. 3416).

Grun: Chemical Abstracts, vol. 20, p. 2658.

Kester: J. Organ. Chem., vol. 8, pp. 550–556.

Certificate of Correction

Patent No. 2,567,842                                         September 11, 1951

JOHN G. ERICKSON

It is hereby certified that error appears in the printed specification of the above numbered patent requiring correction as follows:

Column 1, line 34, for "2-butneyl" read *2-butenyl*; line 44, for "xlyl" read *xylyl*; column 2, line 6, for the patent number "2,252,030" read *2,252,039*; column 4, line 20, for "methoxide" read *methoxides*; lines 22 and 23, for "monoxides" read *nonoxides*; column 8, line 24, after "of" insert the word *the*; column 9, line 47, for "The" read *A*;

and that the said Letters Patent should be read as corrected above, so that the same may conform to the record of the case in the Patent Office.

Signed and sealed this 12th day of February, A. D. 1952.

[SEAL]

THOMAS F. MURPHY,
                                                    *Assistant Commissioner of Patents.*

Certificate of Correction

Patent No. 2,567,842                                 September 11, 1951

JOHN G. ERICKSON

It is hereby certified that error appears in the printed specification of the above numbered patent requiring correction as follows:

Column 1, line 34, for "2-butneyl" read *2-butenyl*; line 44, for "xlyl" read *xylyl*; column 2, line 6, for the patent number "2,252,030" read *2,252,039*; column 4, line 20, for "methoxide" read *methoxides*; lines 22 and 23, for "monoxides" read *nonoxides*; column 8, line 24, after "of" insert the word *the*; column 9, line 47, for "The" read *A*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*